United States Patent [19]

Takahashi

[11] Patent Number: 4,819,921

[45] Date of Patent: Apr. 11, 1989

[54] VICE

[75] Inventor: Shiro Takahashi, Tokyo, Japan

[73] Assignee: Man Design Co., Ltd., Tokyo, Japan

[21] Appl. No.: 146,708

[22] Filed: Jan. 21, 1988

[30] Foreign Application Priority Data

Jan. 29, 1987 [JP] Japan .............................. 62-12041[U]
Jan. 29, 1987 [JP] Japan .............................. 62-12042[U]

[51] Int. Cl.[4] .............................................. B23Q 3/08

[52] U.S. Cl. ........................................ 269/32; 269/81; 269/95; 269/160

[58] Field of Search ........................ 269/20, 22, 24, 25, 269/27, 31, 32, 81, 95, 160; 92/128, 146

[56] References Cited

U.S. PATENT DOCUMENTS 3,554,088 1/1971 Bruyn .................................... 92/128

FOREIGN PATENT DOCUMENTS 1126982 8/1956 France .................................. 269/32
956227 9/1982 U.S.S.R. ................................ 269/20
1197674 7/1970 United Kingdom .

*Primary Examiner*—Frederick R. Schmidt
*Assistant Examiner*—David A. Holmes
*Attorney, Agent, or Firm*—Nixon & Vanderhye

[57] ABSTRACT

A vice has a base fixed to the worktable of a machine, a slider slidable on the base and a fixing-releasing mechanism for selectively fixing the slider to the base and releasing the slider from the base. The fixing-releasing mechanism is provided with an actuator extending through a large hole formed in the base and engageable with the base and the slider. When not applied by pressurized fluid, the actuator fixes the slider to the base, and when applied by the fluid, it releases the slider from the base for the positional adjustment of the slider. The vice also has a piston-cylinder assembly composed of a cylinder tube and a piston assembly slidable in the cylinder tube and surrounding a lead screw in a telescopic manner. When applied by pressurized fluid, the piston assembly as well as the lead screw advances to move a movable clamp element on the slider towards a stationary clamp element fixed on the slider, for clamping a work between both the clamp elements.

17 Claims, 6 Drawing Sheets

VICE

BACKGROUND OF THE INVENTION

1. Field of the Invention

This invention relates to a vice for adjusting the position of stationary and movable clamp elements to the required position on the worktable of a working or handling machine. This invention also relates to a vice having a piston-cylinder assembly for driving the movable clamp element towards the stationary clamp element, to securely and firmly hold a work therebetween.

2. Description of the Related Art

A conventional vice, which holds a work between a pair of clamp elements, is generally fixed in place on the worktable of a working or handling machine. As a result, the vice cannot move the work lengthwise or crosswise on the worktable, nor rotate it to a desired position thereon. When this type of vice is fixed on the worktable of, for example, a small drilling machine, and the worktable itself is fixed, i.e. non-movable/non-rotable, the base of the vice must then be fixed on the worktable at exactly the desired position. Accomplishing this demands special skill.

When the work is displaced from the desired working or handling position, the vice must be readjusted until the work is back in position. Further, when, in the course of processing, the work is set at a plurality of positions or when it is replaced by another work, the position of the base of the vice on the worktable must be changed. The fixing of the vice on another position on the worktable also requires considerable skill and is, moreover, a time-consuming process.

The authors of this invention have developed a vice which comprises a base which is fixed on the worktable of a working or handling machine, a slider which can slide on the worktable and is provided with a stationary clamp element and a movable clamp element, as well as a pressurized-fluid operated unit for fixing the slider to, and disconnecting the same from the base by operating a foot-pedal. In addition, the authors have succeeded in improving the fixing efficiency of the vice, making this a much less protracted operation.

However, when this improved vice is fixed on the worktable of a working machine such as a boring machine, and where the operator uses, say, his right hand to adjust the slider, and his left hand to operate the handle for lowering the working head, there is a danger that the cutting tool mounted on the working head will touch the operator's right hand, causing him potentially serious injury.

The British Patent Specification No. 1,197,674 discloses a vice which comprises a lead screw for selectively moving the movable clamp element toward and away from the stationary clamp element, and a reciprocating piston-cylinder assembly having pistons arranged in series for reciprocating the lead screw in its axial direction.

This piston-cylinder assembly comprises a housing, members arranged in series in the axial direction of the housing and forming piston chambers between the adjacent members, and pistons each fitted in its respective member. The resultant force of the pneumatic pressures exerted on the pistons drives the lead screw via a piston rod carrying the pistons and connected to the lead screw in an end-on manner, whereby a work is clamped between both clamp elements. Compressed air is forcibly supplied to the corresponding piston chambers via a duct formed in the piston rod, in order to reciprocate the piston assembly.

Since the maximum distance between the stationary and movable clamp elements is substantially equal to the maximum diameter or the maximum width of the work to be clamped between the clamp elements, the maximum traveling length of the lead screw must be equal to the maximum distance. Accordingly, the vice according to the British Patent has the maximum dimension along the lead screw equal to the length of the lead screw plus that of the piston-cylinder assembly, resulting in a bulky construction. Further, with this vice, changeover valves must be prepared for the movement of the piston mechanism in one direction and in the opposite direction thereto, respectively. Thus, the fluid control system becomes complicated.

SUMMARY OF THE INVENTION

An objection of this invention is to provide a vice which easily and accurately sets a work on the worktable of a working machine or a handling machine at the required position without approaching any hand of the operator to the working area or the handling area.

Another object of this invention is to provide a vice in which its length is shorter than that of the conventional vice and its fluid control system is more simplified than that of the prior art vice.

In order to achieve the objects, a vice according to this invention comprises a base having a reception depression in the underface thereof and an adjustment hole extending from the reception depression to the upper face thereof, a slider slidable on the base and having in the underface thereof formed an engagement depression provided at its lower part with an engaging portion, a fixing-releasing mechanism for selectively fixing the slider to and releasing the same from the base, a stationary clamp element fixedly mounted on the slider, a movable clamp element selectively approaching the stationary clamp element and separated therefrom on the slider, a lead screw connected at its one end to the movable clamp element and movable in the moving directions of the movable clamp element, and a piston-cylinder assembly holding the other end of the lead screw for reciprocating the same in the moving directions of the movable clamp element.

The fixing-releasing mechanism comprises a bottomed casing mounted in the reception depression in the base, a diaphragm separating the interior of the casing into a first chamber adjacent to the bottom of the casing and having a pressurized fluid introduced thereinto and a second chamber remoter than the first chamber, and an actuator mounted in the first chamber and always biased toward the diaphragm, the actuator comprising a lower portion always abutting against the diaphragm at its lower surface, a guide portion having a thickness providing such a gap between it and the adjustment hole that the slider moves on the base by a predetermined distance and an abutting portion which is formed on the upper end of the guide portion and which is pressed against the engaging portion of the slider when the pressurized fluid is not supplied to the first chamber and is pushed up together with the guide portion to be separated from the engaging portion when the pressurized fluid is supplied to the first chamber.

After the vice has been placed on the worktable of a working machine or a handling machine at a position near the required spot, the pressurized fluid is introduced into the first chamber. Then, the diaphragm is raised by the pressurized fluid, and the abutting portion is lifted together with the guide portion to be removed from the engaging portion of the slider. Since the slider is released from the base, the positional adjustment of the slider is freely and easily carried out. After the adjustment of the slider, the pressurized fluid is discharged from the first chamber. The abutting portion is lowered together with the guide portion and is pressed against the engaging portion of the slider, whereby the slider is fixed to the base.

The piston cylinder assembly comprises a cylinder tube fixed onto the slider and extending lengthwise of the lead screw, a female tube threadably engaging the lead screw, slidable lengthwise of the cylinder tube in it and always biased in the reverse direction to that towards the movable clamp element, and a piston assembly fitted in the cylinder tube and surrounding the greater part of the lead screw when the lead screw is fully inserted into the cylinder tube. The piston assembly comprises a plurality piston sets arranged in series with adjacent sets contacting each other in the cylinder tube, and an end piston disposed on the remotest piston set from the movable clamp element. Fixed to the remoter end of the cylinder tube from the movable clamp element is an end member via which the pressurized fluid is conducted between the end member and the end piston and between each pair of pistons or is discharged therebetween. The piston assembly is moved in the direction towards the movable clamp element or in the direction opposite thereto according to the supply and discharge of the pressurized fluid. As the lead screw has a telescopic relation to the piston assembly, the length of the vice along the lead screw becomes short, making the vice small in construction.

BRIEF DESCRIPTION OF THE DRAWINGS

This invention can be fully understood from the following detailed description read with reference to the accompanying drawings in which.

DETAILED DESCRIPTION OF THE PREFERRED EMBODIMENTS

Figure 4:
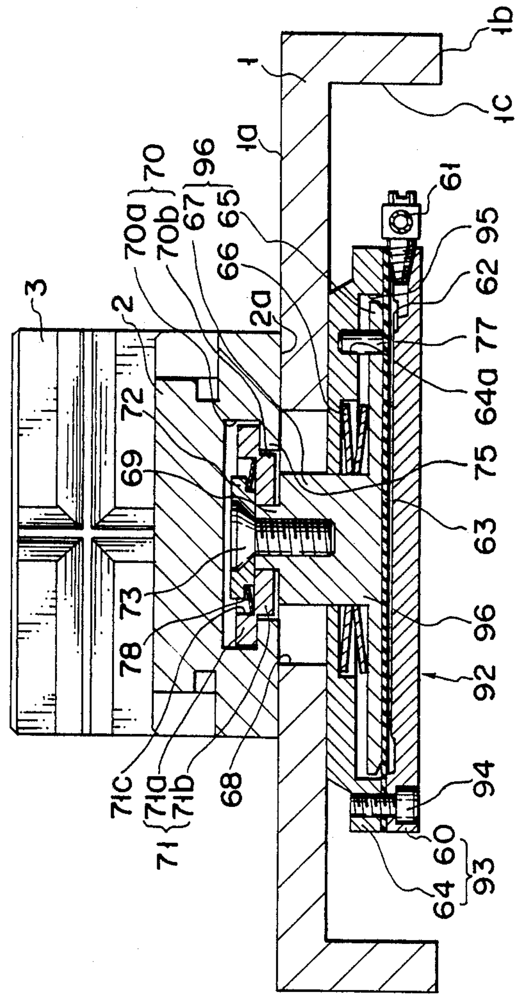
FIG. 4 shows a cross sectional view along line 4—4 of FIG. 3B.

Referring to FIG. 4, a vice according to this invention has a base 1 with an upper face 1*a* and an underface 1*b* parallel to each other. A reception depression or groove 1*c* is formed in underface 1*b* . Underface 1*b* of base 1 is in flush contact with the upper surface of the worktable or the work bed of a machine tool such as a small drilling machine, and base 1 is fixed to the worktable or the work bed (hereinafter referred to only as the "worktable"). A slider 2 having an underface 2*a* and an upper face 2*b* parallel to each other is placed on base 1 such that underface 2*a* of slider 2 can slide on upper face 1*a* of base 1.

Figure 1:
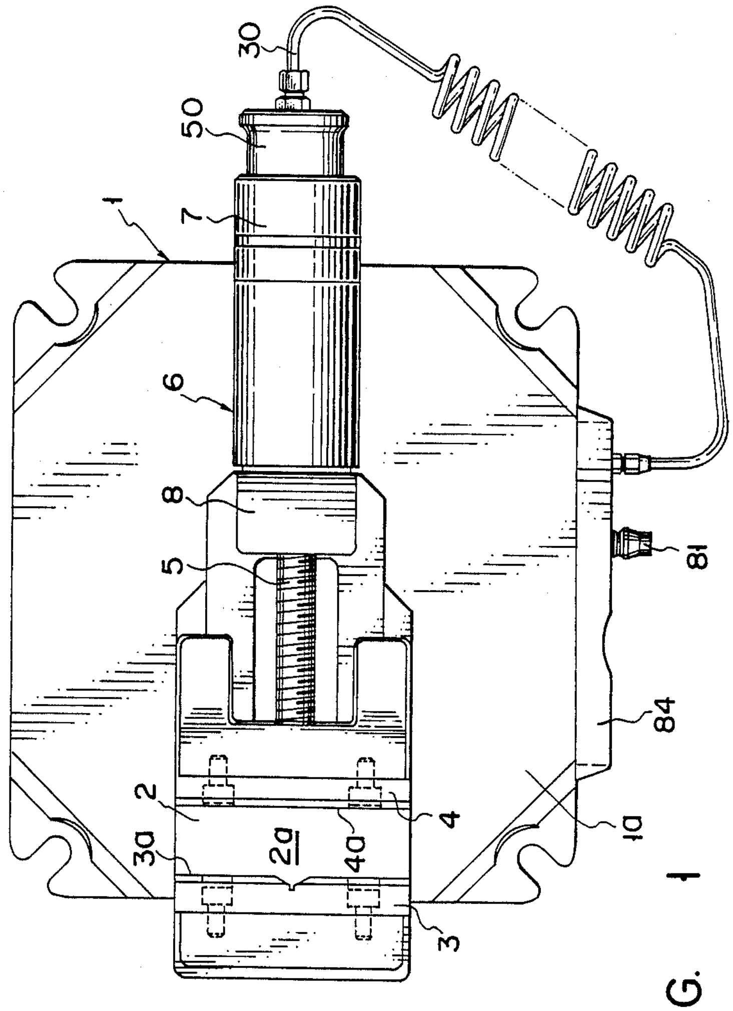
FIG. 1 shows a plan view of an embodiment of a vice according present invention.
Figure 3A:
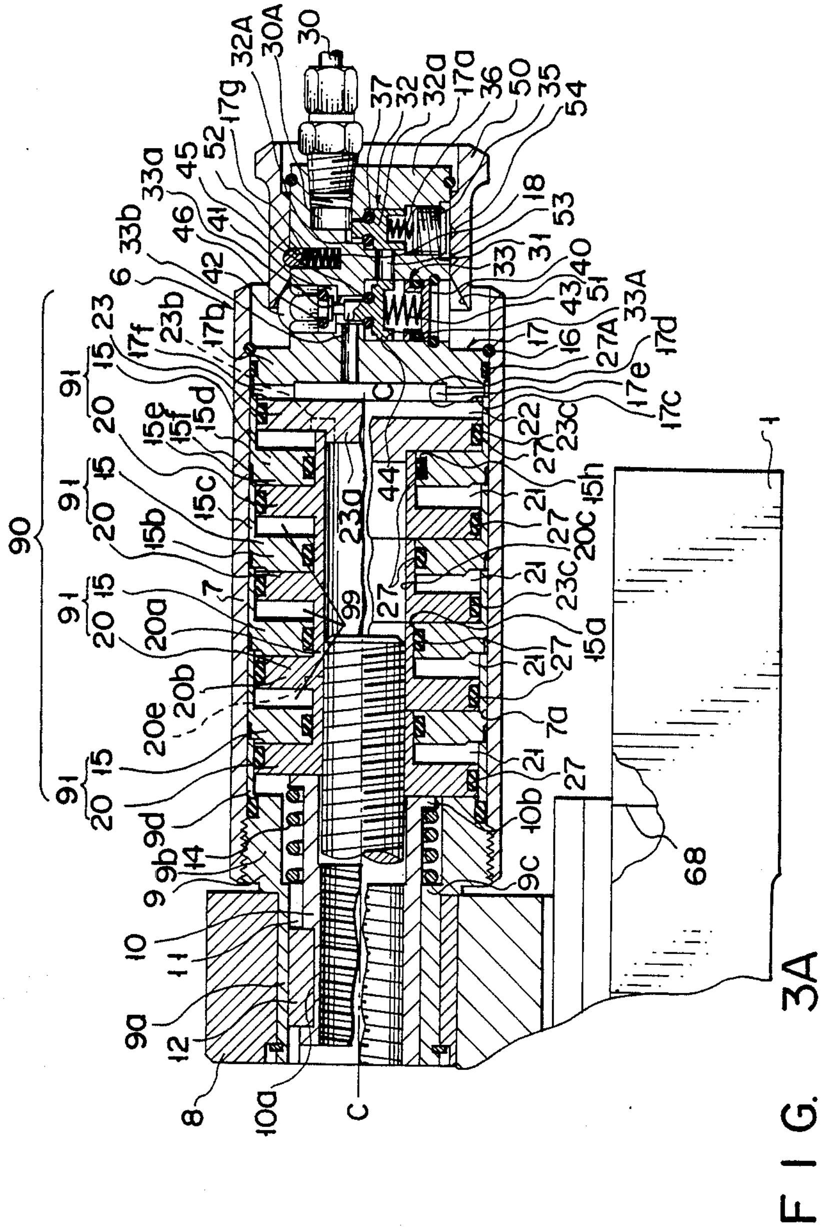
FIG. 3A shows a front elevational view of the greater part of the device of FIG. 1, showing a longitudinal cross sectional view of tne piston-cylinder assembly.
Figure 3B:
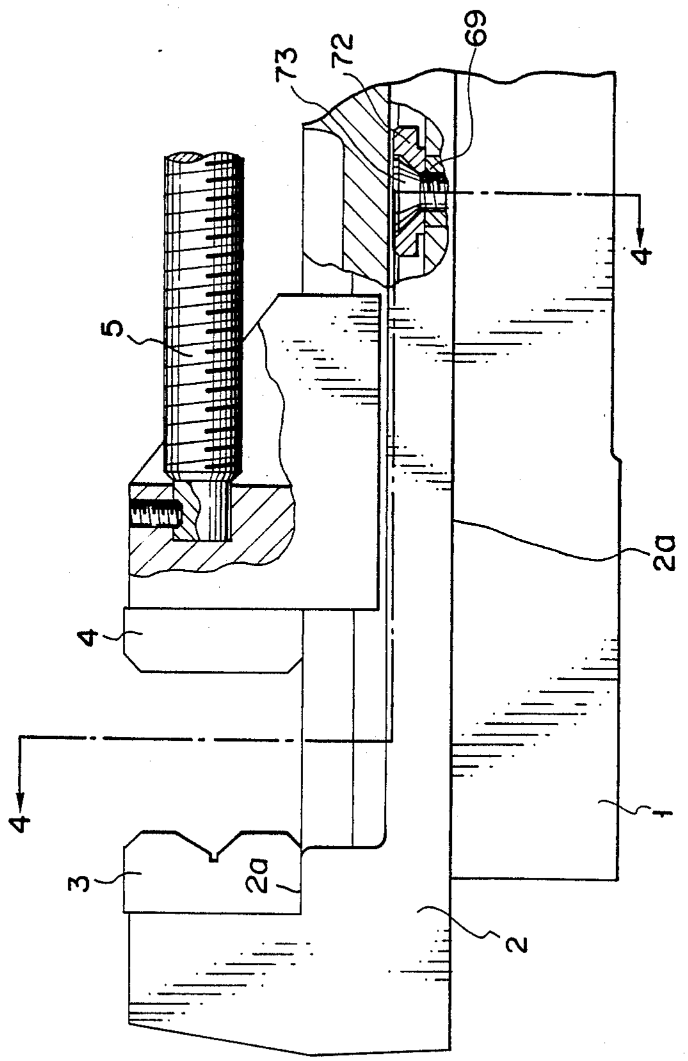
FIG. 3B shows a front elevational view of a part of the device of FIG. 1, showing the stationary clamp element, the movable element, and part of the base and the slider related thereto.

Referring to FIGS. 1, 3A, and 3B, a stationary clamp element 3 is fixed onto the central portion of upper face 2*a* of slider 2, at one end thereof, and has a vertical clamp face 3*a* faces towards the other end of slider 2. The holder 8 of a piston-cylinder assembly 6, described later in detail, is connected to the central portion of upper face 2*a* of slider 2, at the other end thereof. A movable clamp element 4 is reciprocatingly mounted on upper face 2*b* of slider 2, between stationary clamp element 3 and holder 8, and has a vertical clamp face 4*a* parallel to ad facing vertical clamp face 3*a* of stationary clamp element 3. A lead screw 5 is connected at one end to the opposite side of movable clamp element 4 having a vertical clamp face 4*a* which faces vertical clamp element 3*a* of stationary clamp element 3, and is held at the other end by piston cylinder assembly 6. Lead screw 5 is reciprocated by piston cylinder assembly 6 such that movable clamp element 4 selectively moves towards and away from stationary clamp element 3.

As is shown in FIG. 3A, piston-cylinder assembly 6 comprises holder 8 fixed onto upper face 2*b* of slider 2 as described above, an annular connecting member 9 having a boss portion 9*a* inserted in holder 8 from the opposite side to movable clamp element 2 and fixed thereto, and a cylinder tube 7 having one end portion screwed onto annular connecting member 9, fixed thereto and extending therefrom lengthwise and coaxially of lead screw 5, in the opposite direction of movable clamp element 4. Knurlings for rotation are formed on part of the outer face of cylinder tube 7 (FIG. 1).

A female screw tube 10 is inserted in a cylindrical hole formed in boss portion 9*a* and has female threads engaged with lead screw 5. A key 12 is fitted in a key groove 10*a* formed in the outer wall of female screw tube 10 and another groove 11 formed in the inner wall of boss portion 9*b*, preventing female screw tube 10 from rotating with respect to annular connecting member 9. A compression coil spring 14 wound around female screw tube 10 is disposed between a shoulder 9*c* formed on the cylindrical inner wall of annular connecting member 9 and a flanged portion 10*b* of female screw tube 10. A piston assembly 90 contacts a cylindrical inner face 7*a*. As cylinder tube 7 is rotated, female screw tube 10 is caused to revolve and reciprocates lead screw 5 according to the direction of rotation. When not held, movable clamp element 4 moves towards or away from stationary element 3. In FIG. 3A, above line C—C, piston assembly 90 assumes an unclamping condition (hereinafter referred to as the "initial condition") in which it is pushed fully into cylinder tube 7. However, below line C—C in FIG. 3A, piston assembly 90 assumes a clamping condition (hereinafter referred to as the "operating condition") in which piston assembly 90 abuts against the free end of a flange 9*b* of annular connecting member 9.

Piston assembly 90 will no be described in detail.

Piston assembly 90 comprises a plurality of piston sets 91, and an end piston 23 located most remotely from holder 8, which are arranged in series axially of cylinder tube 7.

Figure 5:
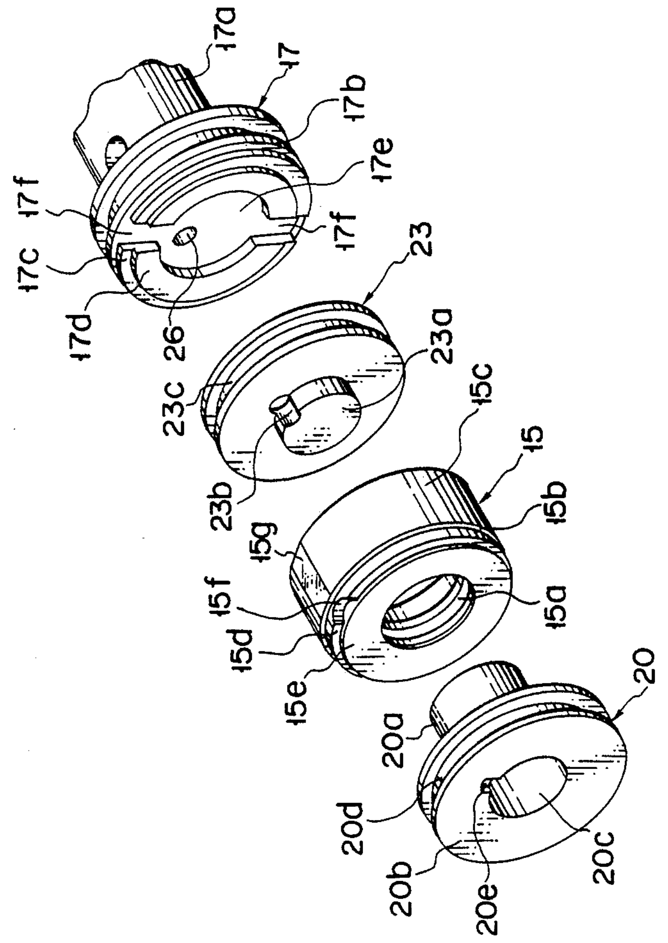
FIG. 5 shows an exploded perspective view of the piston assembly of FIG. 1.

As is shown in FIGS. 3A and 5, each piston set 91 comprises a first piston 15 and a second piston 20 cooperating therewith.

Each first piston 15 comprises an annular wall portion 15*b* having a central hole 15*a* and a rim portion 15*c* which extends from portion 15*b* towards the free end of cylinder tube 7 and slides together with portion 15*b* on cylindrical inner face 7*a* of cylinder tube 7. A first annular projection 15*d* having a diameter smaller than that of annular wall portion 15*b* is formed on that end face of annular wall portion 15*b* which is close to holder 8. Further, a second annular projection 15*e* having a diameter smaller than that of first annular projection 15*d* is coaxially formed on projection 15*d*. A communication groove 15*f* is formed in first annular projection 15*d* so as to open at the outer peripheral wall and the end face thereof, and an axially extending flat portion 15*g* is formed on that portion of the outer peripheral wall of first piston 15 which is radially aligned with communication groove 15*f*. The outer peripheral wall of first piston 15 also has an annular groove 15*h* formed therein.

Each second piston 20 comprises a boss portion 20*a* fitted in central hole 15*a* of first piston 15 and formed having a central hole 20*c* of substantially the same diameter as the outer diameter of lead screw 5, and an annular flanged portion 20*b* formed on that portion of boss portion 20*a* close to holder 8. An annular groove 20*d* is formed in the outer peripheral wall of second piston 20, and a communication groove 20*e* is formed in that end face end of annular flanged portion 20*b* which is close to holder 8. However, the second piston 20 which is closest to holder 8 does not have communication hole 20*e* (FIG. 3A).

In this embodiment, four piston sets 91 are serially arranged in the axial direction of piston tube 7, with the free end face of each rim portion 15*c* and the corresponding end face of adjacent annular wall portion 15*b* of first piston 15 in contact with each other and with the free end face of each boss portion 20*a* and the corresponding end face of adjacent annular flanged portion 20*b* also in contact with each other. In the case of the piston set 91 closest to holder 8, annular flanged portion 20*b* of second piston 20 is fitted in a cylindrical rim 9*d* projecting from the end face of annular connecting member 9 which is remote from holder 8, so that portion 20*b* can slide on cylindrical inner face 7*a* of cylinder tube 7. In the case of each of other piston sets 91, annular flanged portion 20*b* is fitted in rim portion 15*c* of first piston 15.

The aforementioned end piston 23 is a disc-shaped member the outer periphery of which fits flush with the cylindrical inner wall of rim portion 15*c* of first piston 15 of the piston set 91 adjacent to end piston 23. A boss portion 23*a* is formed on that end face of end piston 23 which faces the adjacent first piston 15, and is fitted in the cylindrical inner face of boss portion 20*a* of second piston 20. A blind-ended communication groove 23*b* is formed in the outer periphery of boss portion 23*a* and the body of end piston 23. Groove 23*b* opens at the outer periphery and free end face of boss portion 23*a* and at that end face of its body which faces the adjacent first piston 15. An annular groove 23*c* is formed in the outer peripheral wall of end piston 23. O rings 27 are mounted in annular grooves 15*h*, 20*d*, and 23*c* of first pistons 15, second pistons 20, and end piston 23, and seals are achieved between annular flanged portion 20*b* and rim 9*d* of annular connecting member 9, between annular flanged portions 20*b* and rim portions 15*c* of first pistons 15, between annular wall portions 15*b* of first pistons 15 and boss portions 20*a* of second pistons 20, and between end piston 23 and boss portion 20 of second piston 20 adjacent thereto.

As is shown in FIG. 3A, end member 17 comprises a barrel portion 17*a* and a disk-shaped flanged closing portion 17*b* formed on one end thereof. The outer periphery of closing portion 17*b* is in contact with inner face 7*a* of cylinder tube 7, an O ring 27A being interposed therebetween for sealing. An O stop ring 16 is provided between inner face 7*a* of cylindrical tube 7 and a shoulder of closing portion 17*b* which is remote from holder 8, so as to prevent end member 17 from moving with respect to cylinder tube 7. A pair of horse-shoe shaped projections 17*c* are formed in symmetry with respect to the axis of closing portion 17*b*, on that end face thereof which is close to holder 8, and a pair of horse-shoe shaped projections 17*d*, having an outer diameter smaller than that of horse-shoe shaped projections 17*c* , are similarly formed on the free end face of projections 17*c*. A pressure transmitting chamber 17*e* is defined by the inner peripheries both of projections 17*c* and 17*d* and that end face of closing portion 17*b* which is adjacent thereto. A pair of communication grooves 17*f* diametrically opposed to each other are formed between the opposed ends both of projections 17*c* and 17*d*.

In the initial condition as shown in FIG. 3A, that end face of annular wall portion 15*a* of first piston 15 which is close to holder 8 abuts against the corresponding end face of annular flanged portion 20*b* of second piston 20 adjacent thereto, and an annular space 99 is formed between that end face of annular wall portion 15*a* of first piston 15 which is remote from holder 8 and the corresponding end face of annular flanged portion 20*b* of second piston 20 adjacent thereto.

In the operating condition, however, space 99 is reduced and the end face of annular wall portion 15*a* which is close to holder 8 becomes separated from the corresponding end face of annular flanged portion 20*b* adjacent thereto at the side of holder 8, resulting in a piston chamber 21 being formed therebetween.

Barrel portion 17*a* of end member 17 projects outward from cylindrical tube 7*a* and houses a check valve 32 and a change-over valve as an air-exhaust valve 33. Valve body 32*a* of check valve 32 is mounted in a valve chamber 32A communicating at one end thereof, with an air inlet 30A which leads to an air pipe 30. Valve body 32*a* is urged towards air inlet 30A by a compression coil spring 36, and is pressed against the step formed in valve chamber 32A via an O ring 37 provided on the shoulder of valve body 32*a* to close valve chamber 33A when compressed air is not supplied to air inlet 30A.

A sliding member 44 serving as the valve body of air exhaust valve 33 is mounted in a valve chamber 33A. Sliding member 44 is pressed, via an O ring 45, against the shoulder of a port of valve chamber 33A, to close chamber 33A.

A communication passage 33*a* having a diameter smaller than that of valve chamber 33A extends coaxially from chamber 33A, and a cylindrical air exhaust chamber 41 extends coaxially from passage 33*a* to the outer periphery of barrel portion 17*a* and communicates with the atmosphere. Passage 33*a* communicates with pressure transmitting chamber 17*e* via an air passage 26.

A neck portion 33*b* having a diameter smaller than passage 33*a* extends from the upper end of sliding member 44, passes through passage 33*a* and is connected to a push head 42 in air exhaust chamber 41. Push head 42 has a semi-spherical upper portion and a normal polygonal, for example, a normal hexagonal cross section the vertical edges of which are in contact with the inner wall of air exhaust chamber 41. The neck formed on the lower face of push head 42 is surrounded by an O ring 45. When the upper portion of push head 42 projects outward from the outer periphery of barrel **17*a*, air exhaust chamber 41 communicates with air passage 26. On the other hand, when push head 42 is pushed into air exhaust chamber 41, O ring 45 blocks communication passage 33*a*, thereby to disconnect air exhaust chamber 41 from air passage 26. One end of a connecting passage 31 formed in barrel 17*a* is connected to the lateral wall of valve chamber 32A such that this one end communicates with air inlet 30A when compressed air is supplied to inlet 33A. The other end of passage 31 is connected to the lateral wall of valve chamber 33A such that this other end communicates therewith when push head 42** is pushed downward.

An operation ring 50 is mounted on the outer periphery of barrel **17*a* so as to be movable axially thereof. A frustoconical face 51, the diameter of which gradually increases towards closing portion 17*a*, is formed on that inner end portion of operation ring 50 which faces closing portion 17*b*, and is engageable with the upper portion of push head 42. A first annular groove 53 having a triangular cross section is formed in the inner wall of operation ring 50, and a second annular groove 54, also having a triangular cross section, is formed in that portion of the inner wall of operation ring 50 which is more remote from closing portion 17*b* than first annular groove 53. A radial spring hole 17*g* is formed in barrel 17*a*, and houses a compression coil spring 18 for urging outwardly a ball 52. First annular groove 53, second annular groove 54, and spring hole 17*g* are arranged such that when ball 52 engages first annular groove 53, it touches only the upper portion of push head 42, and, when ball 52 engages second annular groove 54, frustoconical face 51 rides over push head 42 and thereafter, the inner wall of operation ring 50 pushes push heads 42 into air exhaust chamber 41**.

The operation of piston-cylinder assembly 6 will now be described in detail.

When ball 52 is engaged with second annular groove 54, by pushing operation ring 50, and compressed air is introduced into air inlet 30A, valve body **32*a* of check valve 32 in valve chamber 32A is pushed downward by the air pressure, enabling air inlet 30*a* to communicate with connecting passage 31. The compressed air then enters pressure transmitting chamber 17*e* via connecting passage 31, valve chamber 33A, and air passage 26, and presses against that end face of end piston 23 which faces end member 17. Simultaneously, the compressed air presses against that end face of each second piston 20 which is close to end piston 23. The forces acting on the pistons add up to a large resultant force. This resultant force pushes piston-cylinder assembly together with lead screw 5 towards stationary clamp element 3, against the force exerted by spring 14, whereby movable clamp element 4 moves towards stationary clamp element 3. In this way, a work is firmly clamped between the clamp elements. Thereafter, operation ring 50 is pulled, by hand, to cause ball 52 to engage first annular groove 53 first. Head 42 is pushed out by spring 43, thereby to enable air passage 26 to communicate with air exhaust chamber 41. The compressed air in piston-cylinder assembly 6 reaches air passage 26 via the route which is the reverse of that by which the introduction of the compressed air is introduced, and is discharged therefrom to the atmosphere through air exhaust chamber 41 and gaps defined between the inner wall of chamber 41 and the lateral side of head 42. As a result, movable clamp element 4 is separated from stationary clamp element 3 together with piston-cylinder assembly 6 and lead screw 5, and the work can then be removed from between the clamp elements. As piston assembly 90 returns from the operating condition to the initial condition, spaces 99 widen. As spaces 99 widen, piston assembly 90, can nevertheless return with ease to the initial condition, since spaces 99 communicate via communication grooves 20*e* with central hole 20*c***, which has a large volume.

A fixing-release mechanism 92, as shown in FIGS. 3B and 4, is used to selectively fix/release slider 2 to/from base 1.

A cylindrical adjustment through hole 68 is formed in base 1. A casing 93, substantially disc-like in shape, is located in reception depression **1*c* directly under hole 68, and comprises a lower casing portion 60, an upper casing portion 64, and a diaphragm 63 which is made of a flexible material such as rubber and interposed between the two casing portions. Both casing portions 60, 64 and diaphragm 63 are connected to each other by means of bolts 94** (only one shown).

An annular groove 62 is formed in the upper face of lower casing 60 and is connected to an inlet 61 through which compressed air passes. Groove 62 and the space defined between the upper face of lower casing portion 60 and the lower face of diaphragm 63, together form a first cylindrical chamber. A second cylindrical chamber 95, opening downward, is formed in upper casing portion 64. An actuator 96 comprises a pressure-receiving disc 65 and a cylindrical pillar portion 67 formed as a guide portion in the central section of disc 65. Pressure-receiving disk 65 is situated in second chamber 95 in such a manner that, through the medium of a compression coil spring 66, it always urges diaphragm 63 downward.

Part of pillar portion 67 extends into adjustment hole 68 by being inserted through a hole formed in the upper part of upper casing portion 64 and having the same diameter as pillar portion 67. The diameter of pillar portion 67 is smaller than the cross-sectional size of adjustment hole 68, by the amount of the movement necessary for the adjustment of slider 2.

A stepped groove 70 is formed in slider 2 and extends lengthwise thereof. Groove 70, comprising a wide upper portion **70*a* and a narrow lower portion 70*b*, the latter serving as an engaging portion, has a stepped tightening disc 71 arranged therein. Disc 71 has a large-diameter portion 71*a* and a small-diameter portion 71*b*. The diameters of portions 71*a* and 71*b* are substantially the same as the widths of upper and lower portions 70*a* and 70*b*, respectively, but are thinner than them, respectively. A concentric disc-shaped receiving depression 71*c* is formed in the upper face of disc 71, and holds a stop disc 72 which is fixed to pillar portion 72 by a set-screw 67**.

A boss portion 69 formed on pillar portion 67 passes through tightening disc 71. The length of boss portion 69 is greater than the distance between the lower face of small-diameter portion **71*b* and the bottom of receiving depression 71*c*. Tightening disc 71, stop disc 72, and actuator 96 are made to connect with each other by virtue of the urging force of a dish spring 78 interposed between the neck portion of stop disc 72 and the bottom of receiving depression 71*c*. A pin 77, formed on pressure-receiving disc 65, is inserted in a hole 64*a* formed in upper casing portion 64, to prevent casing 93 and actuator 96 from rotating relative to each other. Fixing-releasing mechanism 92 comprises casing 93, diaphragm 63, actuator 96; tightening disc 71, setscrew 73, and dish spring 78**.

When compressed air is not supplied to annular groove 62, actuator 96 is pressed downward by spring 66, causing the lower face of large-diameter portion 71a of tightening disc 71 to abut against the upper face of a stepped portion defined between large-diameter portion 70a and small-diameter portion 70b of stepped groove 70. As a result, lower face 2a of slider 2 is pressed against upper face la of base 1 and fixed to the base.

When introduced into annular groove 62, the compressed air presses against the entire area of underface of diaphragm 63 and lifts it. This causes actuator 96 to be raised together with tightening disc 71, and large-diameter portion 71a to be separated from stepped portion 75 of slider 2. As a result, slider 2 is released from base 1, enabling the position of base 1 to be adjusted.

Figure 2:
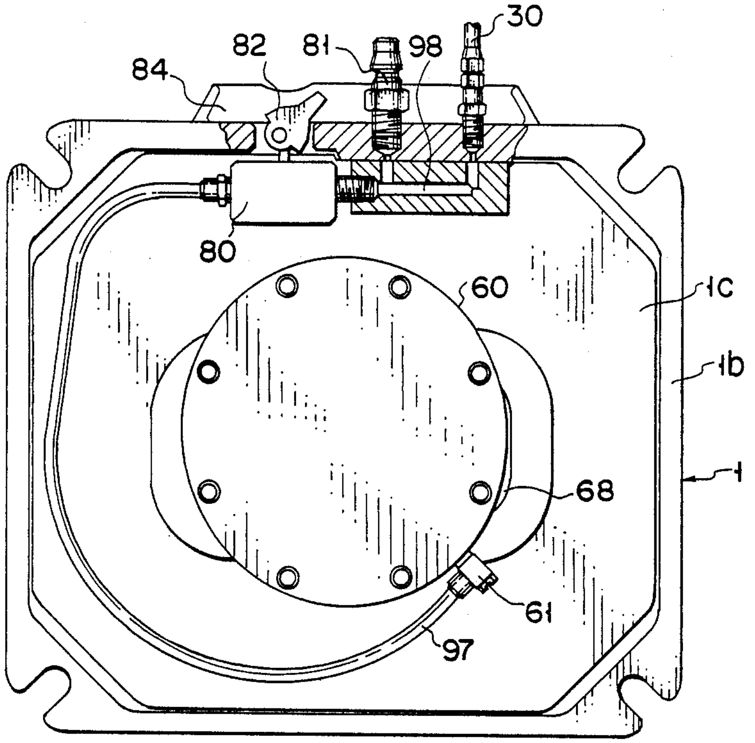
FIG. 2 shows a bottom view of FIG. 1.

Referring to FIG. 2, a change-over valve 80 is provided in reception depression 1c of base 1. Air inlet 61 of casing 93 is connected to the outlet port of valve 80. A nipple 81 is provided on the lateral wall of base 1, and is connected, on one hand, to inlet port of valve 80 and, on the other hand, to a compressed air source (not shown). Nipple 81 is connected, by a connection passage 98 formed in base 1, to air pipe 30 for supplying compressed air to piston-cylinder assembly 6. By operating lever 82, which projects from the lateral side of base 1, the inlet port and the outlet port are selectively connected to each other (this condition being referred to as "on") and disconnected from each other, for the inlet port to be connected to the exhaust port (not shown) (this condition being referred to as "off"). In FIG. 2, the position of lever 82, i.e. on the right-hand-side, indicates that valve 80 is in the "off" condition. When lever 82 is moved to the left, valve 80 is then in the "on" condition. A cover 84 is provided on the lateral side of base 1, to cover and protect lever 82 and to prevent it from being accidently from its current position through an operator inadvertently touching it.

There will now be described the operation of the vice of this invention when it is used on a drilling machine.

First, the vice is fixed on the worktable of the drilling machine, at a position close to the working spot. Then, ball 52 is engaged with first annular groove 53 by pulling operation ring 50. Air exhaust valve 33 is operated to cause piston assembly 90 to communicate with the atmosphere, whereby the compressed air is discharged from assembly 90 When the distance between clamp elements 3, 4 is insufficient for clamping a work therebetween, cylinder tube 7 is rotated counterclockwise, as viewed from operation ring 50, to pull lead screw 5 into cylinder tube 7 until movable clamp element 4 is sufficiently separated from stationary clamp element 3 to enable the work to be inserted therebetween. Next, cylinder tube 7 is rotated clockwise to move piston assembly 90 as well as female screw tube 10 until assembly 90 assumes the initial condition in which end piston 23 abuts against closing portion 17b. Through further clockwise rotation of cylinder tube 7, clamp elements 3, 4 both contact the work which has been placed therebetween. After this preparatory process has been completed, ball 52 is engaged with second annular groove 54. Frustoconical face 51 and the inner face portion adjacent thereto move push head 42 downward, and head 42 closes air exhaust chamber 41, thereby disconnecting piston assembly 90 from the atmosphere and, at the same time connecting assembly 90 to connecting passage 31. Change-over valve 80 is placed in the "off" condition by operating lever 82. The compressed air supplied from nipple 81 to piston assembly 90 via valves 32, 33 urged lead screw 5 as well as piston assembly 90 towards stationary clamp element 3, so that the work is accurately and firmly clamped by elements 3. 4. In this condition, slider 2 remains fixed to base 1, since the compressed air is not supplied to annular groove 62 of lower casing portion Next, change-over valve 80 is turned to the "on" condition by operating lever 82. As a result, compressed air is delivered from nipple 80 to annular groove 62, through air pipe 97, raising actuator 96 as well as diaphragm 63. As was described earlier, slider 2 can be released from base 1, to enable the position of base 1 to be adjusted. Slider 2 is moved on base 1, in order to locate the work directly under the drill edge. This completed, change-over valve 80 is again placed in the "off" condition by operating lever 82. The compressed air is then discharged from annular groove 62, actuator 96 is lowered, and slider 2 can again be fixed to base 1. In order to reset the work, this process is repeated.

When the supply of compressed air from nipple 81 to air inlet 30A is cut off, and ball 52 is engaged with first annular groove 53, the air is discharged from piston assembly 90 to the atmosphere, to drive piston assembly 90 towards end member 17 and finally to return assembly 90 to the initial condition, whereby movable clamp element 4 is separated from stationary clamp element 3, enabling the work to be removed from between the clamp elements.

If the vice of this invention is used on a small drilling machine where the operator handles the working head using one hand and adjusts the work on the vice to a predetermined position using his other hand, the hand adjusting the work will always be sufficiently far away from the cutter mounted on the working head, thereby reducing substantially the risk of injury to the operator.

When the work can be adjusted to position merely by rotation thereof, it is sufficient simply to make the inner diameter of adjustment hole 68 substantially equal to the outer diameter of pillar portion 67.

Base 1 of the embodiment can be substituted by the worktable or work head of a working machine or a handling machine.

Further, while compressed air is used as the compressed fluid in the above embodiment, other fluid such as hydraulic oil ca be used instead.

What is claimed is:

1. A vice comprising:

a base having an upper face and an underface, a reception depression formed in the underface, and an adjustment hole having an inner wall and penetrating through the base from the reception depression to the upper face;

a slider having an upper face and a underface slidable on the base and an engagement depression formed in the underface of the slider, said engagement depression having an engagement portion;

a fixing-releasing mechanism for selectively fixing the slider to and releasing the slider from, the base;

a stationary clamp element fixed to the upper face of the slider;

a movable clamp element reciprocatingly mounted on the upper face of the slider with respect tot he stationary clamp element;

a lead screw having two ends, one end being connected to the movable clamp element and extending away therefrom;

a piston-cylinder assembly holding the other end of the lead-crew, for reciprocating the lead screw with respect to the stationary clamp element, said piston-cylinder assembly comprising a cylinder tube fixed onto the upper face of the slider and extending along the lead screw, said cylinder tube having a cylindrical inner face, a female screw tube axially slidable in the cylinder tube and biased reversely from the stationary clamp element, said female screw tube engaging the lead screw, and a piston assembly having an outer periphery fitted with the inner face of the cylinder tube and, when inserted fully in the cylinder tube, surrounding a greater part of the lead screw, said piston assembly comprising a plurality of piston sets arranged within the cylinder tube in series theralong, and an end piston located within the cylinder tube serially adjacent to a most remote one of said piston sets relative to the movable clamp element, said piston-cylinder assembly having an end member disposed more remote from the end piston with respect the movable clamp element in the cylinder tube, a first space defined between the end member and the piston assembly, second spaces defined between adjacent ones of said piston sets, and valve means provided in the end member for selectively conducting a pressurized fluid into and from said first space and said second spaces, for selectively moving the piston assembly, as well as the lead screw, towards and away from the stationary clamp element;

said fixing-releasing mechanism comprising a casing mounted in the reception depression and having an interior and a bottom, a flexible diaphragm having an upper face and a bottom which divides the interior of the casing into a first chamber at the side of the bottom and a second chamber more remote from the bottom than the first chamber, an actuator having a lower face, said actuator comprising a guide portion having a thickness providing a gap between the inner wall of the adjustment hole and the guide portion which allows for adjustment of the slider with respect to the base, and an abutment portion provided on the engagement portion of the slider when compressed air is not supplied to the first chamber and being separated from the engagement portion by the diaphragm when the compressed air is supplied to the first chamber; and urging means provided in said casing for elastically urging the actuator towards the diaphragm to enable the lower face of the actuator to press against the upper face of the diaphragm.

2. The vice according to claim 1, wherein said actuator has a pressure receiving disc having an upper face and a lower face which is the lower face of the actuator.

3. The vice according to claim 1, wherein said guide portion is cylindrical.

4. The vice according to claim 1, wherein said engagement depression comprises a stepped groove having a wide upper portion and a narrow lower portion and a step portion defined therebetween, and said abutting portion comprises a tightening disc fixed to the guide portion and abuttable against the step portion

5. The vice according to claim 4, wherein said tightening disc comprises a large-diameter portion disposed in the wide upper portion of the stepped groove and having diameter substantially equal to the wide upper portion and a thickness smaller than the wide upper portion, and a small-diameter portion disposed in the narrow lower portion of the stepped groove and having a diameter substantially equal to the narrow lower portion and a thickness smaller than the narrow lower portion.

6. The vice according to claim 4, wherein said tightening disc has a receiving depression formed in the upper face thereof, and said actuator has a stop disc received in the receiving depression and a set-screw for fixing the stop disc to the guide portion.

7. The vice according, to claim 6, wherein said tightening disc has a dish spring interposed between the stop disc and the tightening disc.

8. The vice according to claim 2, wherein a compression coil spring is interposed between the casing and the pressure-receiving disc.

9. The vice according to claim 1, wherein said casing comprises an upper casing portion in which the second chamber is formed and lower casing portion in which the first chamber is formed, and said diaphragm is interposed between the upper and lower casing portions.

10. The vice according to claim 9, wherein said lower casing portion has an upper face and said first chamber comprises an annular groove formed in the upper face of the lower casing portion.

11. The vice according to claim 1, wherein a pin is provided between the actuator and the casing for preventing relative rotation therebetween.

12. The vice according to claim 1, wherein each of said piston sets comprises a first piston and a second piston arranged in tandem and supply means provided in the piston-cylinder assembly for supplying the pressurized fluid to the first space and the second spaces.

13. The vice according to claim 12, wherein:

said first piston comprises an annular wall portion having an outer peripheral portion with an outer diameter substantially equal to the inner diameter of the cylinder tube and one end face facing the movable clamp element, and a rim portion having a cylindrical inner face, extending rim the outer peripheral portion of the annular wall portion of the first piston towards the end member and abutting against the annular wall portion of the first piston of that piston set which is disposed adjacent thereto at the side of the end member;

said second piston comprises an annular flanged portion having a central hole, the diameter of which defines an inner diameter of the second piston substantially equal to the outer diameter of the lead screw and having an inner peripheral portion and an outer peripheral face slidable on the cylindrical inner face of the rim portion of the first piston, and a boss portion extending from the inner peripheral portion of the annular flanged portion towards the end member and abutting against the annular flanged portion of the second piston of that piston set which is disposed adjacent thereto at the side of the end member; and said supply means comprises a pressurized fluid inlet formed in the end member, duct means formed in the end member, connecting the inlet to the first space and having the valve means provided therein, each space defined by a flat portion formed on the entire length of the outer periphery of the first piston and the cylindrical inner face of the cylinder tube and a radial communication groove formed on end face of the annular wall portion and continuous to the flat portion of the outer periphery of the first piston.

14. The vice according to claim 12, wherein said first piston has an end face at the side of the movable clamp element provided with a stepped disk-shaped projection.

15. The vice according to claim 12, wherein said end member has at the side of the piston end an end face provided with a pair of stepped horse-shoe shaped projections axially symmetrical with each other with respect to the piston end.

16. The vice according to claim 1, wherein said valve means comprises a check valve connected to the pressurized fluid inlet, and a change-over valve selectively connecting the first and second spaces to the check valve and to the atmosphere.

17. The device according to claim 13, wherein said annular flanged portion of the second piston defines a communication groove for establishing fluid communication between corresponding ones of the second spaces and the central hole of the second piston so as to allow pressurized fluid to flow therebetween.

* * * * *